(12) United States Patent  
Huang et al.

(10) Patent No.: US 10,187,640 B2  
(45) Date of Patent: Jan. 22, 2019

(54) METHOD OF HARD-LIMITED PACKET SIZE FOR VIDEO ENCODING

(71) Applicant: MediaTek Inc., Hsin-Chu (TW)

(72) Inventors: Chao-Chih Huang, New Taipei (TW); Ting-An Lin, Hsinchu (TW); Shen-Kai Chang, Zhubei (TW); Han-Liang Chou, Baoshan Township, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 209 days.

(21) Appl. No.: 15/191,308

(22) Filed: Jun. 23, 2016

(65) Prior Publication Data

US 2017/0064310 A1 Mar. 2, 2017

Related U.S. Application Data

(60) Provisional application No. 62/212,825, filed on Sep. 1, 2015.

(51) Int. Cl.
```
H04N 7/12      (2006.01)
H04N 19/61     (2014.01)
H04N 19/17     (2014.01)
H04N 19/15     (2014.01)
H04N 19/176    (2014.01)
H04N 19/174    (2014.01)
H04N 19/169    (2014.01)
```
(52) U.S. Cl.  
CPC .......... *H04N 19/15* (2014.11); *H04N 19/174* (2014.11); *H04N 19/176* (2014.11); *H04N 19/188* (2014.11)

(58) Field of Classification Search  
USPC ......................................................... 375/240  
See application file for complete search history.

(56) References Cited

U.S. PATENT DOCUMENTS

| | | | | |
|---|---|---|---|---|
| 2008/0316977 | A1* | 12/2008 | Malladi ................ | H04L 1/0041 370/335 |
| 2008/0317146 | A1* | 12/2008 | Kwon ................... | H04L 1/0071 375/260 |
| 2012/0170648 | A1* | 7/2012 | Chen ...................... | H04N 19/70 375/240.03 |
| 2013/0202025 | A1* | 8/2013 | Baron .............. | H04N 19/00139 375/240.02 |
| 2015/0195577 | A1* | 7/2015 | Hannuksela ........... | H04N 19/44 375/240.25 |

* cited by examiner

*Primary Examiner* — Jorge L Ortiz Criado  
*Assistant Examiner* — Susan E. Hodges  
(74) *Attorney, Agent, or Firm* — McClure, Qualey & Rodack, LLP

(57) ABSTRACT

A method and system for encoding a group of coding blocks and packetizing the compressed data into slices/packets with hard-limited packet size are disclosed. According to the present invention, a packetization map for at least a portion of a current picture is determined. The packetization map associates coding blocks in at least a portion of the current picture with one or more packets by identifying a corresponding group of coding blocks for each packet of said one or more packets. The corresponding group of coding blocks for each packet is then encoded according to the packetization map and the size of each packet is determined. The packet size is checked. If any packet size exceeds a constrained size, a new packetization map is generated and the corresponding group of coding blocks for each packet is encoded according to the new packetization map.

18 Claims, 4 Drawing Sheets

METHOD OF HARD-LIMITED PACKET SIZE FOR VIDEO ENCODING

CROSS REFERENCE TO RELATED APPLICATIONS

The present invention claims priority to U.S. Provisional Patent Application Ser. No. 62/212,825, filed Sep. 1, 2015. The U.S. Provisional Patent Application is hereby incorporated by reference in its entirety.

FIELD OF THE INVENTION

The present invention relates to video coding. In particular, the present invention relates to techniques of encoding a group of coding blocks of video data and packetizing bitstream with hard-limited packet/slice size.

BACKGROUND AND RELATED ART

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock (MB) or similar block configuration. In addition, intra-coding is also adaptively applied, where the picture is processed without reference to any other picture. The inter-predicted or intra-predicted residues are usually further processed by transformation, quantization, and entropy coding to generate compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance. Such system structure has been widely used in various modern video coding systems such as H.264/AVC and HEVC (High Efficiency Video Coding.

FIG. 1 illustrates an exemplary system block diagram for a video encoder using adaptive Inter/Intra prediction. In the system, a picture is divided into multiple coding units. For Inter-prediction, Motion Estimation (ME)/Motion Compensation (MC, 112) is used to provide prediction data based on video data from other picture or pictures. Switch 114 selects Intra prediction data from Intra Prediction 110 or Inter-prediction data from ME/MC 112. The selected prediction data (136) is supplied to Adder 116 to be subtracted from the input video data in order to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, various in-loop processing 130 is applied to the reconstructed video data before the reconstructed video data are stored in the Reference Picture Buffer 134 in order to improve video quality. The in-loop filter information may have to be incorporated in the bitstream so that a decoder can properly recover the required information. Therefore, in-loop filter information from SAO is provided to Entropy Encoder 122 for incorporation into the bitstream. For the High Efficiency Video Coding (HEVC) standard, the in-loop filter process 130 may correspond to Deblocking Filter (DF) and Sample Adaptive Offset (SAO). For H.264/AVC video standard, the in-loop filter process 130 may correspond to Deblocking Filter (DF).

FIG. 2 illustrates a system block diagram of an exemplary video decoder corresponding to the video encoder in FIG. 1. Since the encoder also contains a local decoder for reconstructing the video data, some decoder components are also used in the encoder. For a decoder, entropy decoder 222 is used to parse and recover the coded syntax elements related to residues, motion information and other control data. The switch 214 selects intra-prediction or inter-prediction and the selected prediction data are supplied to reconstruction (REC) 228 to be combined with recovered residues. Besides performing entropy decoding on compressed video data, entropy decoding 222 is also responsible for entropy decoding of side information and provides the side information to respective blocks. For example, intra mode information is provided to intra-prediction 210, inter mode information is provided to motion compensation 212, in-loop filter information may be provided to in-loop filter 230 and residues are provided to inverse quantization 224. The residues are processed by IQ 224, IT 226 and subsequent reconstruction process to reconstruct the video data. Again, reconstructed video data from REC 228 undergo in-loop filtering 230 as shown in FIG. 2.

Due to the Inter/Intra prediction process and various other processing (e.g. in-loop filtering) used in video coding, data dependency exists among coded data. If any error happens to compressed video data, the effect of errors may propagate such as from block to block, slice to slice, or picture to picture. To alleviate this issue, video coding system often partitions video data to smaller video units and reduce data dependency among video units. In more advanced coding standards such as H.264/AVC and HEVC (high efficiency video coding), a picture is divided into slices or groups of coding units. The compressed video data from each slice or each group of coding units are packetized into a well-defined data structure.

While the well-defined data structure may also be referred as a packet, the term "packet" is different from the term "packet" widely used in switched networks or streaming networks. There are various potential benefits associated with packetized transmission over networks. For example, packet transmission allows easy integration of video, voice and data in the network environment. Nevertheless, the term "packet" in this disclosure is related to the data structure for slices or groups of coding units as specified in H.264/AVC and HEVC.

In practice, a maximum slice size or packet size may be imposed to avoid the need for a very large buffer. With this constraint imposed, a conventional encoder system may try to fit a group of coding units or macroblocks into a slice/packet with size limitation by processing the coding unit or macroblock (MB) one by one. For example, if the n-th coding unit or MB of a group of coding units or MBs is being encoded, the accumulated compressed data up to the n-th coding unit or MB will be checked. If the accumulated compressed data exceeds the maximum slice/packet size, the encoder state is set to the end of the (n−1)-th coding unit or MB. The packetization for the current slice/packet is terminated (i.e., without including the compressed data from the n-th coding unit or MB). The encoding process then starts a new slice/packet and encodes the n-th coding unit or MB as the first coding unit or MB for the new slice/packet. The encoding process then checks the accumulated compressed data and the encoding process continues until all coding units or MBs in a picture are done.

While the above method is intuitive and robust, it is hard to implement in hardware. Accordingly, it is desirable to develop a method and/or system that is more suited for hardware implementation.

BRIEF SUMMARY OF THE INVENTION

A method and system for encoding a group of coding blocks and packetizing the compressed data into slices/packets with hard-limited packet size are disclosed. According to the present invention, a packetization map for at least a portion of a current picture is determined. The packetization map associates coding blocks in at least a portion of the current picture with one or more packets by identifying a corresponding group of coding blocks for each packet of said one or more packets. The corresponding group of coding blocks for each packet is then encoded according to the packetization map and the size of each packet is determined. The packet size is checked. If a packet size exceeds a constrained size, a new packetization map is generated and the corresponding group of coding blocks for each packet is encoded according to the new packetization map.

Each coding block may correspond to a coding unit (CU) or a macroblock (MB). When a new packetization map is generated, the coding parameters for the corresponding group of coding blocks stay the same when the packetization map is regenerated. The coding parameters for the corresponding group of coding blocks may comprise block type, motion vector or both.

One aspect of the present invention addresses generating an initial packetization map for the video coding/packetization process. The initial packetization map can be generated by assigning a fixed number of coding blocks to each packet. In one example, one coding block is assigned to each packet. The initial packetization map can also be generated by assigning a number of coding blocks to each packet based on the ratio of constrained packet size to the target bitrate per coding block. In yet another example, the final packetization map of a last coded picture is used as the initial packetization map for the current picture.

The packetization map can be regenerated by splitting each over-sized packet into at least two packets. Furthermore, if the total packet size of two packets is equal to or smaller than the constrained size, the two packets can be merged into one. Various ways to split an over-sized packet are disclosed. In one example, the total number of coding blocks in each over-sized packet is equally divided for the two packets. In another approach, a measured value for each coding block is determined. The first K coding blocks from a total of N coding blocks in each over-size packet are selected for a first packet of the at least two packets. K is determined according to the index k that minimizes $|(\Sigma_{i=1}^{k} M_i / \Sigma_{i=1}^{N} M_i) - (R_{packet}/R_{total})|$, where $M_i$ corresponds to a measured value of i-th coding block in each over-size packet, N is a total number of coding blocks in each over-size packet, $R_{total}$ corresponds to the size of each over-sized packet, and $R_{packet}$ corresponds to the constrained packet size. The measured value may correspond to coding error or distortion of the i-th coding block, such as the sum of absolute difference (SAD). The measured value may also correspond to the activity measure for each coding block.

The packetization map may comprise indication for a number of total coding blocks in each packet. The packetization map may also comprise a coding block identifier for the coding block at beginning of each packet. The size of each packet can be determined in unit of bits, bytes, or other physical size unit.

The system incorporating the present invention may comprise a video encoding unit and a video coding decision module. The video coding decision module is configured to provide a packetization map and to regenerate the packetization map. On the other hand, the video encoding unit is configured to encode coding blocks according to the packetization map and to determine the resulting packet sizes. The video encoding unit can be implemented using hardware comprising circuitry. The video coding decision module can be implemented using software or firmware executable on a programmable device, a controller or a processing unit.

DETAILED DESCRIPTION OF THE INVENTION

As mentioned above, when a maximum packet size is imposed, the solution provided by existing video encoders is difficult to implement in hardware. Accordingly, the present invention discloses a method and system to overcome a method that is hardware friendly when a hard-limit is imposed on the packet size.

Figure 1:
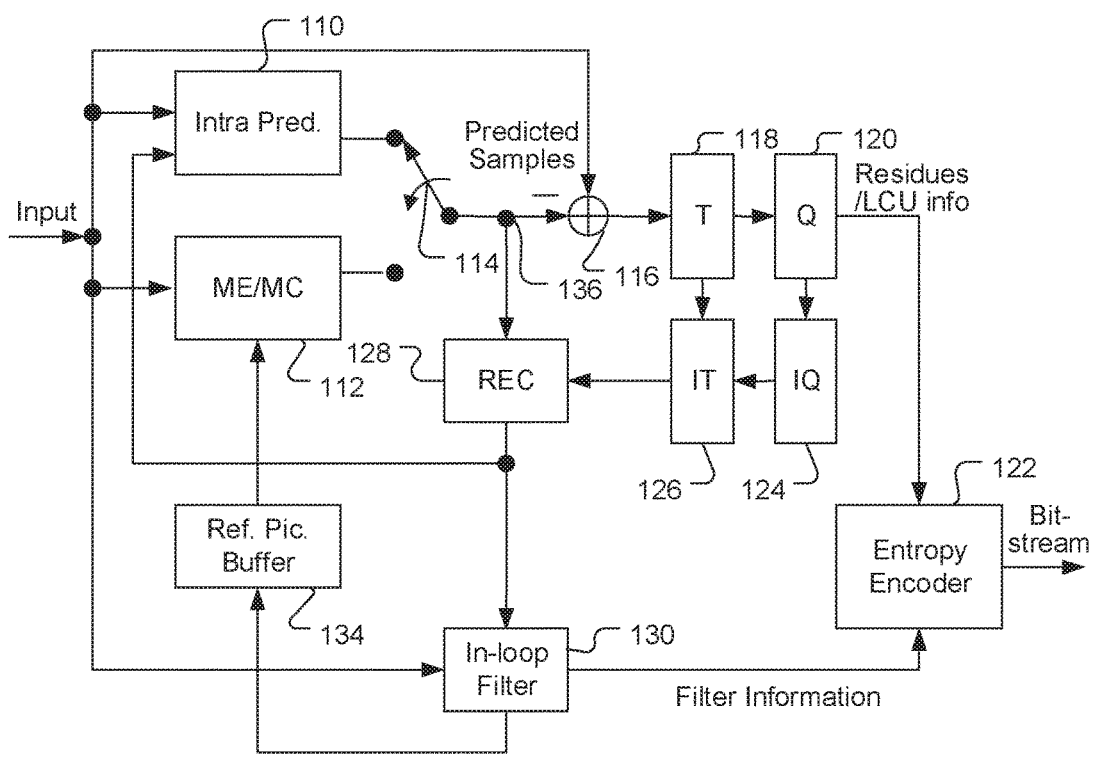
FIG. 1 illustrates a block diagram of an exemplary video encoding system using adaptive Inter/Intra prediction.
Figure 2:
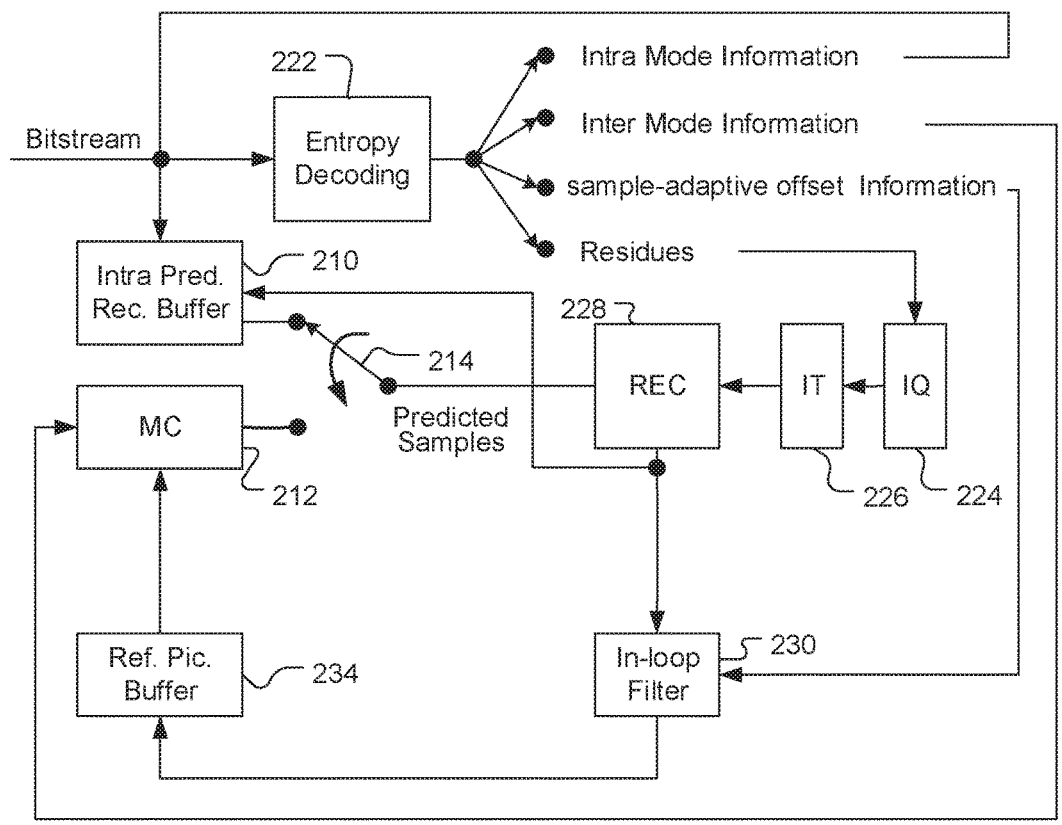
FIG. 2 illustrates a block diagram of an exemplary video decoding system using adaptive Inter/Intra prediction.
Figure 3:
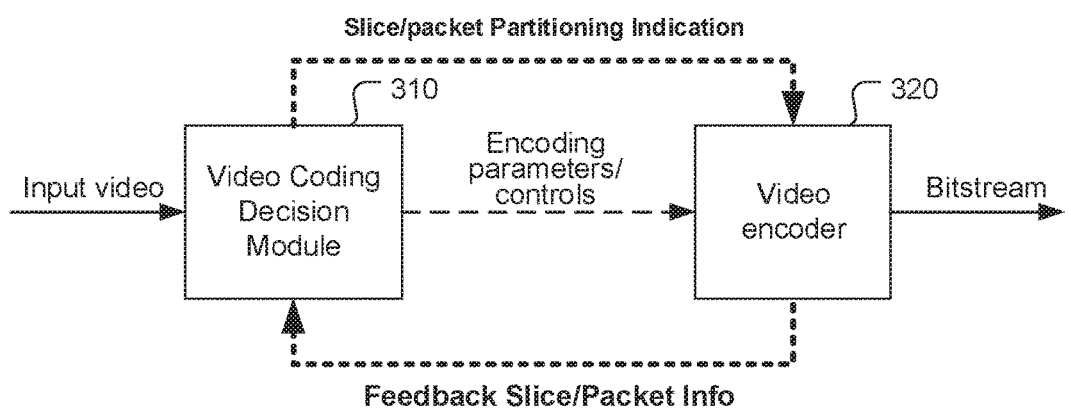
FIG. 3 illustrates an exemplary system incorporating an embodiment of the present invention, where the system comprises two major units: a video decision module and a video decoder.

An exemplary system incorporating an embodiment of the present invention is shown in FIG. 3, where the system comprises two major units: a video decision module 310 and a video encoder 320. The video decision module 310 determines encoding parameters for a group of video coding units. The group of video coding units may correspond to one or more frames or multiple macroblocks in a same frame. The video decision module 310 also determines packet/slice partitioning indications. The encoding parameters and packet/slice partitioning indications determined by the video decision module 310 are provided to the video encoder 320. The video encoder 320 then generates corresponding bitstream based on the given the explicit packet/slice partitioning indication information from the video coding decision module. After the bitstream is generated for the current group of coding units, the packet/slice information is fed back to the video coding decision module.

According to the present invention, the video coding decision module 310 will provide packet/slice partitioning indication to the video encoder 320. The packet/slice partitioning indication may be for a whole picture or for a portion of the picture. The packet/slice partitioning indication may include the number of macroblocks in each packet or macroblock identification numbers at the beginning of packets. The number of macroblocks in each packet or the macroblock identification number for the macroblock at the beginning of each packet forms the packetization may for packet/slice partitioning indication. The packet/slice partitioning indication can be used to instruct the video encoder how to packetize the generated compressed data. The macroblock may correspond to the coding unit (CU) as defined in the HEVC standard. In general, the present invention can be applied to any coding blocks (e.g. MB and CU).

On the other hand, the video encoder 320 will provide feedback to the video coding decision module 310 regarding packet/slice information. The packet/slice information may include the size of each encoded packet/slice and identification to locate each packet. The size of each encoded packet/slice may be measured in the unit of bits, bytes, or other physical size unit. The identification for locating each packet can be based on the coding unit identification number at the beginning of each packet/slice.

An example to achieve hard-limited packet size based on the present invention is described as follows. The following steps can be applied to a pre-defined group of coding units until packetization of the group of coding units meets packet-size constraints:

1. Decision module 310 provides an initial guess of packetization map.
2. Video encoder 320 encodes and reports the length of each packet.
3. Decision module 310 verifies the feedback packet information. If a packet exceeds constrained packet size:
   a. Regenerate a packetization map
   b. Go back to step 2

To start the video coding/packetization process, an initial packetization map is generated. One aspect of the present invention addresses generating an initial packetization map for the video coding/packetization process. The initial packetization map can be generated by assigning a fixed number of coding blocks to each packet. In one example, a single coding block is assigned to each packet. In this case, the corresponding packet size is likely very small. Therefore, the packets may become candidates for merging to form a larger packet, but smaller than the constrained packet size. In some other embodiments, a large amount of coding blocks are assigned to each packet. In this case, the corresponding packet size is likely very large. Therefore, the packets may become candidates for splitting to form a smaller packet, which is smaller than the constrained packet size. The restriction on the maximum packet size can be imposed selectively. In some situations, a system may elect not to impose the restriction on the maximum packet size. In some other embodiments, the number of coding blocks assigned to each packet may be set to any other constant, which should not be limited in this disclosure. In another example, the initial packetization map can be derived based on the final packetization map of the last coded picture.

In yet another example, the number of coding blocks can be determined using information about the target bitrate or bit number for the current picture. This target bitrate or bit number for the current picture can be determined for an intended bit rate control. The initial packetization map can also be generated by assigning a number of coding blocks to each packet based on the ratio of constrained packet size to the target bitrate per coding block. If the constrained packet size corresponds to $R_{packet}$ and the target bit corresponds to R'target per coding block, the number of coding blocks per packet is derived according to ($R_{packet}$/R'target). If the target bit number for the picture is Rtarget, the target bit R'target per coding block is derived based on (Rtarget/($W_{MB}*H_{MB}$)), where $W_{MB}$ corresponds to the total number of coding blocks in the picture width and $H_{MB}$ corresponds to the total number of coding blocks in the picture height.

In one embodiment, the decision module 310 always provides identical macroblock (MB) parameters such as MB type/motion vectors when packetization map is regenerated to resolve the issue of packet size exceeding the size limit.

In the above step for regenerating a packetization map, each oversized packet can be split into at least two packets if the packet size limitation is exceeded. On the other hand, any two or more consecutive packets can be checked to determine if they can be merged. If the total size of these two packets is still less than the constrained size, these two packets will be merged.

Another aspect of the present invention addresses splitting over-sized packet. Various ways to split an over-sized packet are disclosed. In one example, the total number of coding blocks in each over-sized packet is equally divided for the two packets. Since a coding blocking is usually not split between two packets, the equally dividing total number of coding blocks in each over-sized packet may result in the one packet having one more coding block than the other when the total number of coding blocks in an over-sized packet is an odd number.

In another approach, a measured value for each coding block is determined. The first K coding blocks from a total of N coding blocks in each over-size packet are selected for a first packet of the at least two packets. K is determined according the index k that minimizes $|(\Sigma_{i=1}^{k}Mi/\Sigma_{i=1}^{N}Mi)-(R_{packet}/R_{total})|$, where Mi corresponds to a measured value of i-th coding block in each over-size packet, N is a total number of coding blocks in each over-size packet, $R_{total}$ corresponds to the size of each over-sized packet, and $R_{packet}$ corresponds to the constrained packet size. The measured value may correspond to coding error of the i-th coding block, such as the sum of absolute difference (SAD), which is a measurement in video coding. In some embodiments, the measured value may correspond to the activity measure for each coding block. There are several activity measures in the field of video coding. For example, the activity measure may correspond to the mean-squared difference between the individual pixel and the mean value for the block.

The system components as shown in FIG. 3 can be implemented in hardware or software. Since the video encoding process is highly computational intensive, a hardware-based video encoder may achieve high performance. Therefore, the video encoder may be implemented using dedicated circuitry such as encoding accelerator to speed up the needed operations (e.g. motion estimation). On the other hand, it may be desirable to provide flexibility to the video coding decision module. Accordingly, the video coding decision module may be implemented using software or firmware executable on a programmable device, a controller or a processing unit.

Figure 4:
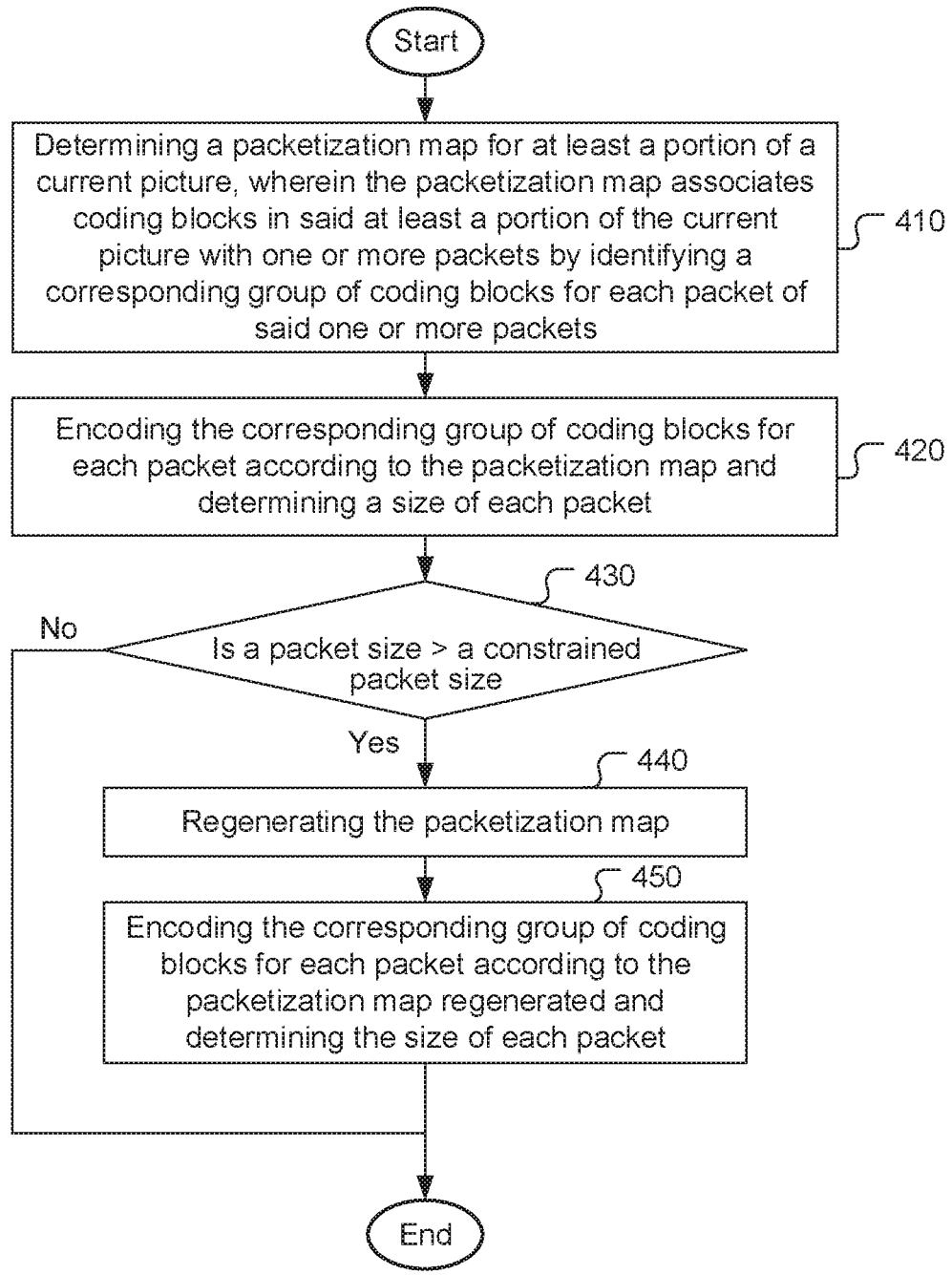
FIG. 4 illustrates an exemplary flowchart for a coding system incorporating packetization maps to efficient achieve hard-limited packet size according to an embodiment of the present invention.

FIG. 4 illustrates an exemplary flowchart for a coding system incorporating packetization maps to efficient achieve hard-limited packet size according to an embodiment of the present invention. A packetization map is determined for at least a portion of a current picture as shown in step 410, wherein the packetization map associates coding blocks in said at least a portion of the current picture with one or more packets by identifying a corresponding group of coding blocks for each packet of said one or more packets. The corresponding group of coding blocks is encoded for each packet according to the packetization map and the size of each packet is determined in step 420. The packet size is checked in step 420 to determine if any packet size is greater than the constrained size. If the result is "Yes", step 440 and step 450 are performed. Otherwise (i.e., the "No" path), the process is ended. In step 440, a packetization map is regenerated. In step 450, the corresponding group of coding blocks is encoded for each packet according to the packetization map regenerated and the size of each packet is determined. While FIG. 3 illustrates an example where an updated packetization map is generated, the corresponding group of coding blocks for each packet is encoded according to the updated packetization map regenerated and the size of each packet is determined, and the process may be ended, the process goes to step 430 for checking the packet size to determine if any packet size exceeds the constrained size.

The flowcharts shown above are intended to illustrate an example according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video coding, comprising:
receiving one or more pictures or multiple macroblocks in a same picture;
determining a packetization map for at least a portion of a current picture of the one or more pictures or multiple macroblocks, wherein the packetization map associates coding blocks in said at least a portion of the current picture with one or more packets by identifying a corresponding group of coding blocks for each packet of said one or more packets;
encoding the corresponding group of coding blocks for each packet according to the packetization map and determining a size of each packet;
in response to a packet size exceeds a constrained packet size, performing steps i) and ii):
  i) regenerating the packetization map; and
  ii) encoding the corresponding group of coding blocks for each packet according to the packetization map regenerated and determining the size of each packet,
wherein said regenerating the packetization map splits each over-sized packet into at least two packets, and wherein a first K coding blocks from the coding blocks in each over-size packet are selected for a first packet of said at least two packets, wherein K is selected according to k that minimizes $|(\Sigma_{i=1}^{k} Mi/\Sigma_{i=1}^{N} Mi) - (R_{packet}/R_{total})|$, Mi corresponds to a measured value of i-th coding block in each over-size packet, N is a total number of coding blocks in each over-size packet, Rtotal corresponds to the size of each over-sized packet, and Rpacket corresponds to the constrained packet size; and
generating a bitstream based on the determined packetization map.

2. The method of claim 1, wherein said determining the packetization map determines an initial packetization map for said at least a portion of the current picture as the packetization map initially.

3. The method of claim 2, wherein the initial packetization map is derived by assigning a fixed number of coding blocks to each packet.

4. The method of claim 2, wherein the initial packetization map is derived by assigning a target number of coding blocks to each packet, wherein the target number of coding blocks is related to a ratio of the constrained packet size to a target bitrate per coding block.

5. The method of claim 2, wherein the initial packetization map corresponds to a final packetization map of a last coded picture.

6. The method of claim 1, wherein coding parameters for the corresponding group of coding blocks stay the same when the packetization map is regenerated.

7. The method of claim 1, wherein each over-sized packet is split into two packets by equally dividing a total number of coding blocks in each over-sized packet for the two packets.

8. The method of claim 1, further comprising merging at least two packets into one, in response to a total packet size of the at least two packets being equal to or smaller than the constrained packet size.

9. The method of claim 1, wherein the packetization map comprises indication for a number of total coding blocks in each packet.

10. The method of claim 1, wherein the packetization map comprises a coding block identifier for the coding block at beginning of each packet.

11. A system for video coding, comprising:
a video encoding circuit, wherein the video encoding circuit receives one or more pictures or multiple macroblocks in a same picture; and
a video coding decision circuit;
wherein the video coding decision circuit is configured to provide a packetization map for at least a portion of a current picture of the one or more pictures or multiple macroblocks to the video encoding circuit, and wherein the packetization map associates coding blocks in said at least a portion of the current picture with one or more packets by identifying a corresponding group of coding blocks for each packet of said one or more packets and wherein the video encoding circuit is configured to encode the corresponding group of coding blocks for each packet according to the packetization map and determining a size of each packet;
wherein, in response to a packet size exceeding a constrained packet size, the video coding decision circuit and the video encoding circuit are further configured to perform steps i) and ii):
  i) to configure the video coding decision circuit to regenerate the packetization map; and
  ii) to configure the video encoding circuit to encode the corresponding group of coding blocks for each packet according to the packetization map regenerated and to determine the size of each packet,
wherein said regenerating the packetization map splits each over-sized packet into at least two packets, and wherein a first K coding blocks from the coding blocks in each over-size packet are selected for a first packet of said at least two packets, wherein K is selected according to k that minimizes $|(\Sigma_{i=1}^{k} Mi/\Sigma_{i=1}^{N} Mi) - (R_{packet}/R_{total})|$, Mi corresponds to a measured value of i-th coding block in each over-size packet, N is a total number of coding blocks in each over-size packet, Rtotal corresponds to the size of each over-sized packet, and Rpacket corresponds to the constrained packet size; and
wherein the video encoding circuit generates a bitstream based on the packetization map from the video coding decision circuit.

12. The system of claim 11, wherein the video coding decision circuit provides coding parameters to the video encoding circuit, and wherein the coding parameters for the corresponding group of coding blocks stay the same when the packetization map is regenerated.

13. The system of claim 11, wherein the video coding decision circuit is configured to regenerate the packetization map by splitting each over-sized packet into at least two packets.

14. The system of claim 11, wherein the video coding decision circuit is further configured to merge at least two packets into one in response to a total packet size of the at least two packets being equal to or smaller than the constrained packet size.

15. The system of claim 11, wherein the packetization map comprises indication for a number of total coding blocks in each packet.

16. The system of claim 11, wherein the packetization map comprises a coding block identifier for the coding block at beginning of each packet.

17. The system of claim 11, wherein the video encoding circuit is implemented using hardware comprising circuitry.

18. The system of claim 11, wherein the video coding decision circuit is implemented using software or firmware executable on a programmable device, a controller or a processing circuit.

* * * * *